US008433106B2

(12) United States Patent
Jessen et al.

(10) Patent No.: US 8,433,106 B2
(45) Date of Patent: Apr. 30, 2013

(54) INCREASING FACE DETECTION SPEED

(75) Inventors: Clay Jessen, Denver, CO (US); Daniel Bloom, Loveland, CO (US); Darryl Greig, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1219 days.

(21) Appl. No.: 12/259,776

(22) Filed: Oct. 28, 2008

(65) Prior Publication Data
US 2010/0008549 A1    Jan. 14, 2010

Related U.S. Application Data

(60) Provisional application No. 61/078,831, filed on Jul. 8, 2008.

(51) Int. Cl.
*G06K 9/00*   (2006.01)
(52) U.S. Cl.
USPC ........... 382/118; 382/103; 382/166; 382/190; 382/224
(58) Field of Classification Search .................. 382/103, 382/118, 165, 166, 22, 190, 224
See application file for complete search history.

(56) References Cited

U.S. PATENT DOCUMENTS

| | | | |
|---|---|---|---|
| 7,099,504 B2 * | 8/2006 | Blake et al. ................... | 382/159 |
| 7,190,829 B2 * | 3/2007 | Zhang et al. .................. | 382/165 |
| 7,391,908 B2 * | 6/2008 | Blake et al. ................... | 382/225 |
| 7,574,037 B2 * | 8/2009 | Hidai et al. ................... | 382/159 |
| 7,587,069 B2 * | 9/2009 | Movellan et al. ............. | 382/118 |
| 7,693,301 B2 * | 4/2010 | Li et al. ......................... | 382/103 |
| 7,983,480 B2 * | 7/2011 | Lu et al. ........................ | 382/166 |
| 8,139,817 B2 * | 3/2012 | Laganiere et al. ............ | 382/103 |
| 8,254,643 B2 * | 8/2012 | Shi et al. ....................... | 382/118 |
| 2005/0013479 A1 | 1/2005 | Xiao et al. | |
| 2005/0102246 A1 | 5/2005 | Movellan et al. | |
| 2005/0265603 A1 | 12/2005 | Porter et al. | |
| 2007/0154096 A1 | 7/2007 | Cao et al. | |
| 2007/0189627 A1 * | 8/2007 | Cohen et al. .................. | 382/254 |
| 2008/0232693 A1 * | 9/2008 | Guan et al. .................... | 382/190 |
| 2009/0324008 A1 * | 12/2009 | Kongqiao et al. ............. | 382/103 |

* cited by examiner

*Primary Examiner* — Gregory M Desire

(57) ABSTRACT

Systems, methods, and other embodiments associated with increasing face detection speed are described. One example method includes determining whether to control a face detection process to selectively perform a face detection in a patch in a digital image. The face detection may be based, at least in part, on determining whether the patch overlaps a face previously identified by the face detection process. The example method may also include providing a signal to control the face detection process to perform the face detection upon determining that a patch overlap does not exceed an overlap factor.

17 Claims, 6 Drawing Sheets

INCREASING FACE DETECTION SPEED

CROSS REFERENCE TO RELATED APPLICATIONS

This Application claims the benefit of provisional patent application Ser. No. 61/078,831, filed Jul. 8, 2008; entitled "Increasing Face Detection speed" which application is incorporated by reference herein as if reproduced in full below.

BACKGROUND

Face detection processes associated with digital images are computationally intensive. Digital cameras may attempt to detect faces in a live-view mode while faces are in motion. If the face detection process is slow, it may return a face after the face has already moved to a different location. This will render the results of the face detection process invalid. Speeding up the face detection process makes cameras more user friendly in greater numbers of situations involving motion. These situations include a camera operator with a shaky hand, faces in the image that are in motion, and so on.

During a face detection process, faces may be searched for using a sampling strategy. One example strategy may include examining every individual patch of a particular size in an image by traversing the digital image from left to right and top to bottom. The patch size may then be increased or decreased (re-scaled) and the entire image may again be traversed. This traversing and re-scaling process may be repeating many times until all possible patches have been examined. This results in a large number of regions being evaluated multiple times at different patch sizes even when a face has already been detected in a related patch. Additionally, when the traversal increments are small, large numbers of regions are evaluated multiple times at the same patch size due to overlap.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
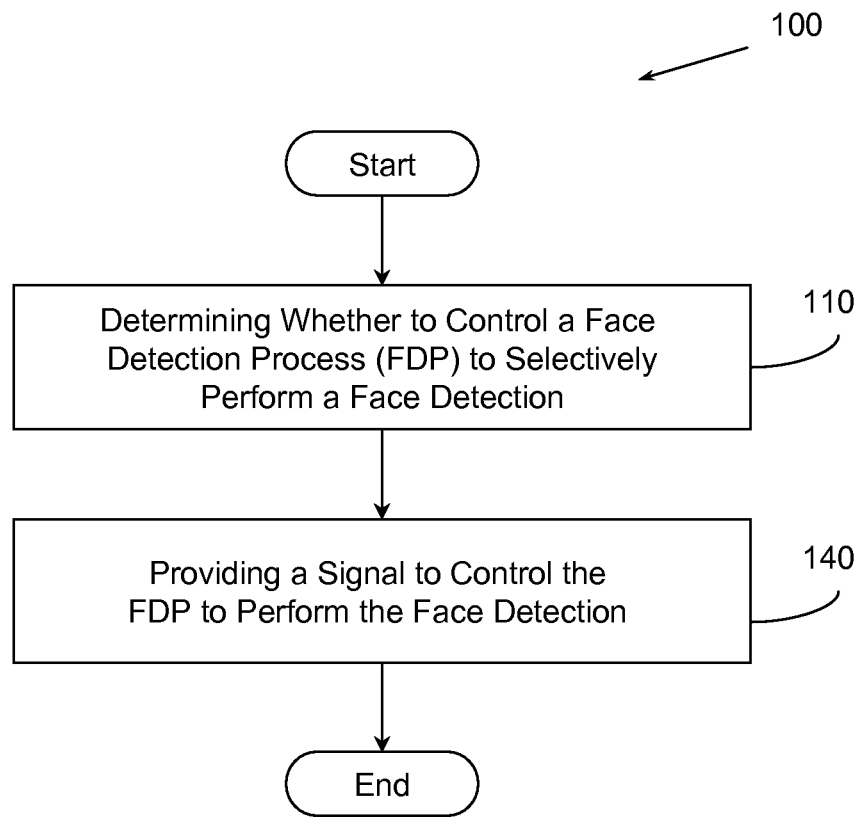
FIG. 1 illustrates an example method associated with increasing the speed of face detection.

When utilizing a face detection sampling strategy with search overlaps (e.g. where the same region is sampled multiple times) a method or system may first perform a check on the patch to be evaluated for a face before actually evaluating the patch. The check may determine whether a part of the patch to be evaluated touches a region that the face detector previously classified as containing a face. This may include the patch being inside of or partially overlapping a region previously classified as containing a face. In some cases, if overlap is detected, then face detection is not performed and the sampling strategy increments to the next patch location. This saves time. However, in other cases the degree of overlap of a patch may be checked against an overlap factor. The degree of patch overlap may be the percentage of the patch that overlaps previously detected face locations. In one example, if the patch overlap percentage exceeds an overlap factor, the sampling strategy traverses to the next patch without running a face detection process on the patch. However, if the patch overlap does not exceed the overlap factor, the face detection process may be performed.

The modified face detection sampling strategy performed by example systems and methods runs faster than conventional systems by eliminating unnecessary executions of the face detection process. This is accomplished by skipping over regions that would return redundant or inconsequential results. Additionally, the modified sampling strategy may skip over regions that could not possibly contain a face (e.g. small regions that overlap a large region that already contains a face). The amount of processing required to perform this check for a previously detected face is less than the processing required to perform redundant face detection processes. Thus, the check for a previously detected face skips unnecessary face detection processes without compromising the results of the face detection sampling strategy. This saves time over conventional systems.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.

SRAM: static RAM.
ROM: read only memory.
PROM: programmable ROM.
USB: universal serial bus.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a data structure (e.g. a list, a queue, a heap, a tree) a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, and so on, that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, logics, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 associated with increasing the speed of face detection. Method 100 may include, at 110, determining whether to control a face detection process (FDP) to selectively perform a face detection. The face detection may be performed in a patch in a digital image. The digital image may be stored, for example, in a digital camera (e.g., still camera, movie camera). The patch may have initial configuration parameters that may be rescaled as face detection proceeds. The determination concerning whether to perform an FDP on a patch may be based, at least in part, on whether the patch overlaps a face previously identified by the FDP. As described above, whether the patch is deemed to overlap a previously identified face may include determining a degree of overlap.

Method 100 may also include, at 140, providing a signal to control the FDP to perform the face detection. The signal may be provided upon determining that a patch overlap does not exceed an overlap factor. In one example, the overlap factor may be set at 0.0%, so that the patch overlap of a single pixel will exceed the overlap factor. This percentage prevents a search for a face when there is any overlap. In another example, the determination of whether the patch overlaps a face previously identified by the FDP at 110 may include identifying that pixels of the patch are in the same location as pixels previously identified by the FDP as a face. The patch may be a defined area of the digital image to be searched for a face with the patch having a defined size. The patch may be a rectangular shape, however one skilled in the art will realize that other shapes may be used as a patch.

In one example, method 100 may be performed in an every location every scale search sampling (ELESSS) that steps through patch locations on a digital image. Sampling of patches in a conventional ELESSS would include performing a processor intense face detection process during every step through the image. However, in the modified ELESSS example, method 100 controls whether the face detection process would be initiated for a particular step (e.g. patch location). In another example, when method 100 is used to control an ELESSS, method 100 may determine that the patch overlap exceeds the overlap factor and control the ELESSS to step to the next patch location without performing the FDP on the patch. This may save time by preventing face detection for patches that overlap other patches that have already been identified as containing a face.

In one example, method 100 may control the ELESSS to incrementally step through different patch locations in the digital image. In one example, method 100 may control the ELESSS to step through the patch locations from left to right and top to bottom. This stepping may continue until all of the patches have been searched. The patch dimensions may be constant throughout the steps. In another example, method 100 may control the ELESSS to re-scale the patch dimensions after stepping is complete for one pass through the patch. This re-scaling may be performed after the ELESSS has finished stepping through the patch locations from left to right and top to bottom. A detailed example of the ELESSS re-scaling the patch may also be seen in the graphics and description of FIG. 3, (e.g., scaling the patch at 330).

In another example, the method 100 may also include storing data that identifies the locations of faces previously detected by the FDP in a data store. Storing data that identifies the locations of faces may include storing data that identifies the location of the patch that contains a face. For example, the locations stored that identify a face may be a rectangular shape (e.g. rectangular patch) that contains a face but may also contain an area beyond the edges of a face. Information stored concerning areas beyond the face edge may depend on the particular face detection.

While FIG. 1 illustrates various actions occurring in serial, it is to be appreciated that various actions illustrated in FIG. 1 could occur substantially in parallel. By way of illustration, a first process could determine whether to control a face detection process (FDP) to selectively perform a face detection at 110 and a second process could provide a signal to control the FDP to perform the face detection at 140. While two processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method. While executable instructions associated with the above method are described as being stored on a computer-readable medium, it is to be appreciated that executable instructions associated with other example methods described herein may also be stored on a computer-readable medium.

Figure 2:
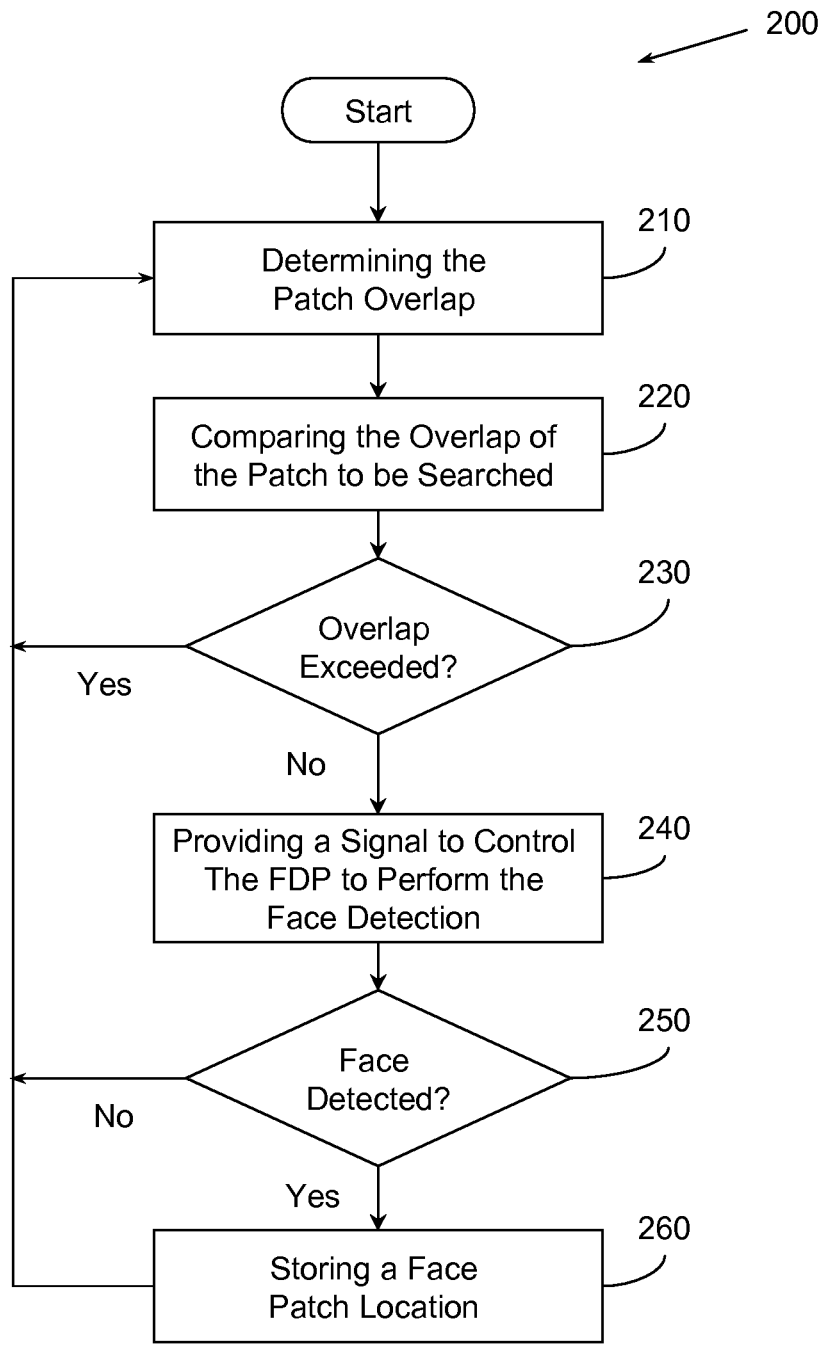
FIG. 2 illustrates an example method associated with increasing the speed of face detection.

FIG. 2 illustrates a method 200 associated with increasing the speed of face detection. Method 200 includes some actions similar to those described in connection with method 100 (FIG. 1). For example, method 200 includes providing a signal to control the FDP to perform the face detection at 240 and determining the patch overlap at 210. Determining the patch overlap at 210 may include computing the number of patch pixels that overlap the locations of faces previously detected by the face detection process (FDP). The number of patch pixels that overlap may then be divided by the number of pixels in the patch to determine the patch overlap. One skilled in the art will realize that means other than totaling and dividing may be used to calculate the patch overlap.

Method 200 may also include, at 220, comparing the overlap of the patch to be searched. Comparing, at 220, the overlap of the patch to be searched may include comparing the patch overlap with the overlap factor. The overlap factor may be a pre-determined percentage. For example, the overlap factor may be set at 10% to allow a search to occur when there is a small overlap. In another example, the overlap factor may be set at 0.0%, so that the patch overlap of a single pixel will exceed the overlap factor. This percentage prevents a search when there is any overlap. In one example the overlap factor may be a pre-defined threshold amount that may be reconfigured by a user.

Method 200 may also include, at 230, determining whether the overlap is exceeded. Determining if the overlap is exceeded at 230 may include determining if the patch overlap exceeds the overlap factor. If the patch overlap exceeds the overlap factor, method 200 returns to 210. However, if the patch overlap does not exceed the overlap factor, method 200 proceeds, at 240, to provide a signal to control the FDP to perform the face detection.

Method 200 may also include, at 250, determining if a face was detected. The detection of a face may be performed by the FDP to which the signal was provided at 240. If a face is not detected, then method 200 returns to 210. However, if the FDP detects a face, method 200 advances to 260.

Method 200 may also include, at 260, storing a face patch location. The storing at 260 may include storing, in a data store, data that identifies the location of a face in response to the FDP determining that the patch being searched contains a face. The data may include for example, (x, y) coordinates, scale information, a database of locations, mathematical representations of coordinates, and so on.

In another example, the storing at 260 may include storing the location that identifies the patch that contains the face identified by the FDP. This data may identify the locations of faces previously detected by the FDP. Storing data that identifies the locations of faces may include storing data that identifies the location of the patch that contains a face. For example, the locations stored that identify a face may be a rectangular shape (e.g. rectangular patch) that contains a face but may also contain an area beyond the edges of a face. Information stored concerning excess areas beyond the face edge may depend on the particular face detection.

Figure 3:
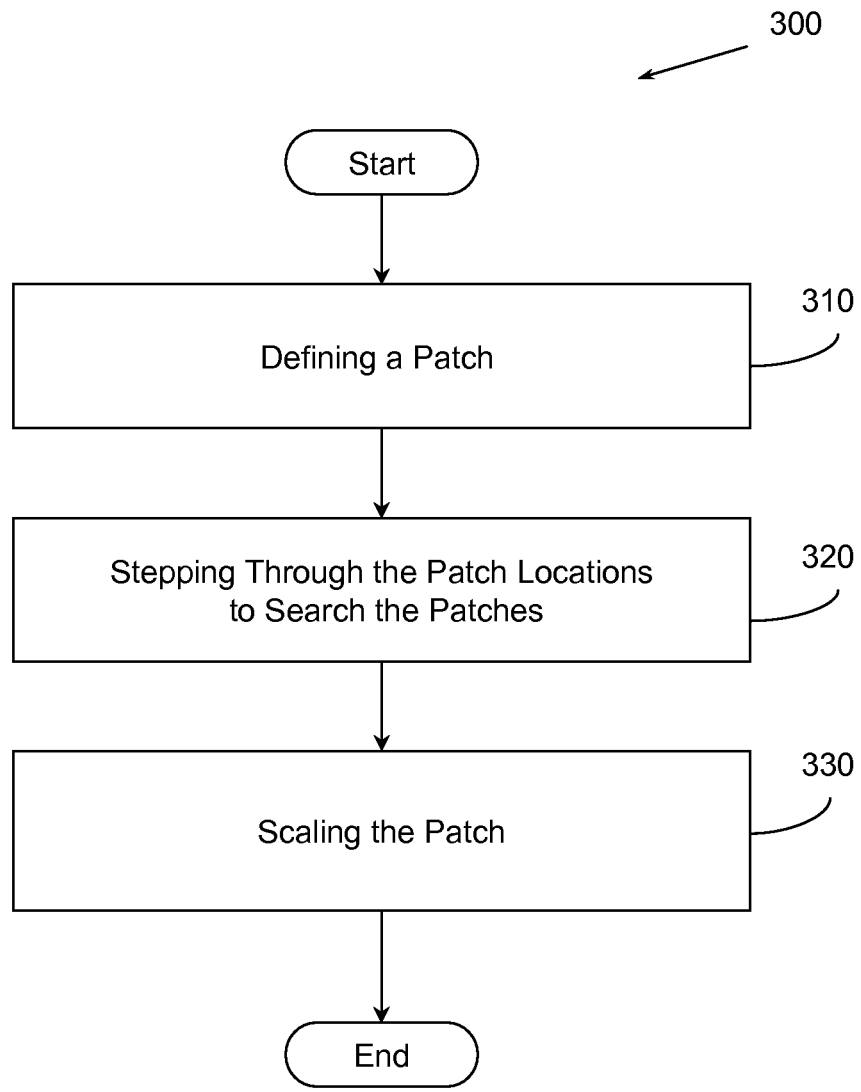
FIG. 3 illustrates an example method associated with an every location every scale search sampling (ELESSS) that steps through patch locations on a digital image. The ELESSS may be modified to increase the speed of face detection by preventing the re-finding of faces.

FIG. 3 illustrates a method 300 associated with an every location every scale search sampling (ELESSS) that steps through patch locations on a digital image. The ELESSS may be controlled by example systems and methods to increase the speed of face detection by preventing searches in patches in which faces have already been found.

Method 300 may include, at 310, defining a patch. For example, defining a patch may include defining the dimensions of the patch to search for a face using the face detection process (FDP).

Method 300 may also include, at 320, stepping through patch locations to search the patches. The stepping may include, for example, stepping through the patch locations of the digital image to search patches with the FDP. Stepping through patch locations may include stepping through the patch locations from left to right and top to bottom. This stepping may continue until all of the patches have been searched. While stepping has been described as occurring from left to right and top to bottom, one skilled in the art will understand that other searching patterns may be utilized. In one example, the patch dimensions may be constant throughout the steps. One example stepping is described in association with the graphics and description of FIG. 6. Additionally, the methods to increase the speed of face detection in FIGS. 1 and 2 may be used to control the ELESSS of FIG. 3. Those methods may, after an ELESSS step, determine whether to run a face detection process in the patch to which the ELESSS stepped.

Method 300 may also include, at 330, scaling the patch. Scaling the patch at 330 may include re-scaling the patch dimensions after a complete pass of stepping through patch locations in a digital image. Once the patch dimensions are re-scaled, the ELESSS steps through the patch locations again using the new patch dimensions. The re-scaling may be performed after the ELESSS has completed stepping through the patch locations in a digital image from left to right and top to bottom.

In one example, defining a patch at block 310 may include defining a rectangular window that is searched by the FDP.

To facilitate understanding the methods in FIGS. 1-3, the example code is provided.

```
void RunFaceDetect(UINT8 *pImage,FaceList *pFaceList)
// pImage is buffer of image to be evaluated.
// pFaceList is struct holding number of faces found and their
corresponding coordinates.
{
    int numDetections = 0;
    // number of currently detected faces.
    Box boxes [MAXDETECTIONS];
    // struct to hold the coordinates of found faces.
    // MAXDETECTIONS is previously set value.
    int patchSize = MIN(m_width, m_height);
    // set to the minimum of the image's width or height
    // (previously set positive values).
    // this is the maximum size that a face in the image could be.
    while (patchSize >= m_minimumFaceSize)
    // continue to evaluate images until patchSize is smaller
    // that the minimum face size (previously set positive value).
```

```
    {
        for (int i = 1; i < m_height - patchSize; i++)
        // traverse through image top to bottom.
        {
            for (int j = 1; j < m_width - patchSize; j++)
            // traverse through image left to right.
            {
                int undetectedStep =
        StepsToUndetected(i,j,patchSize,numDetections,boxes);
                // run check
                if (undetectedStep > 0) {
                    j += undetectedStep;
                    // jump forward
                    continue;
                }
                int classification = EvaluatePatch(i,j);
                // evaluate the current coordinates
                // if a face was detected,
                // save the box that outlines the face
                if (classification != NOTFACE)
                {
                    if (numDetections < MAXDETECTIONS)
                    {
                        boxes[numDetections].left = j;
                        boxes[numDetections].top = i;
                        boxes[numDetections].right = j +
                    patchSize;
                        boxes[numDetections].bottom = i +
                    patchSize;
                        numDetections++;
                        // increment number of detections.
                    }
                }
            } // end left to right.
        } // end top to bottom.
        patchSize = patchSize * m_scaleFactor;
        // patchSize is decreased by set amount.
        // m_scaleFactor is previously set value between 0 and 1.
    } // end patchSize >= m_minimumFaceSize.
    if ( pFaceList->length >= numDetections ) pFaceList->length =
numDetections;
    for ( int i=0; i < pFaceList->length; i++)
    {
        pFaceList->entry[i] = boxes[i];
    }
    // copy number of faces and
    // their corresponding coordinates into pFaceList.
    return;
}
{
    // compare to faces found
    for ( int n=0; n < numDetections; ++n )
    {
        int prevLeft = boxes[n].left;
        int prevRight = boxes[n].right;
        int prevTop = boxes[n].top;
        int prevBottom = boxes[n].bottom;
        // if in region where face was detected
        if ( ( ( ( x >= prevLeft ) && ( x <= prevRight ) )
            || ( ( x + patchSize >= prevLeft ) && ( x + patchSize <=
        prevRight ) )
            || ( ( x <= prevLeft ) && ( x + patchSize >= prevRight ) ) )
            && ( ( ( y >= prevTop ) && ( y <= prevBottom ) )
            || ( ( y + patchSize >= prevTop ) && ( y + patchSize <=
        prevBottom ))
            || ( ( y <= prevTop ) && ( y + patchSize >= prevBottom ) ) ) )
        {
            return (prevRight - x + 1);
        }
    }
    // these coordinates have not been found
    return 0;
};
```

Figure 4:
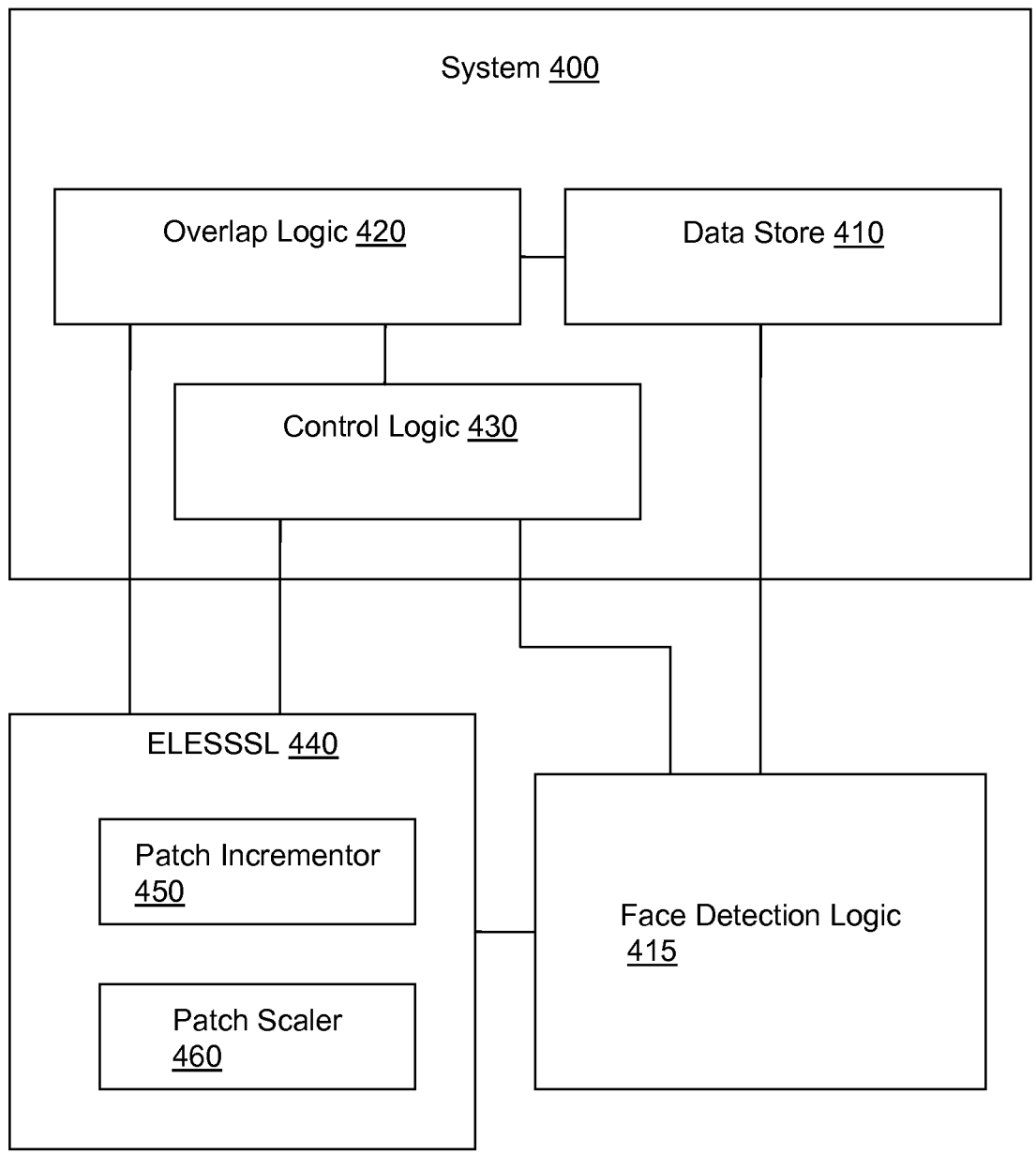
FIG. 4 illustrates an example system that increases the speed of face detection.

FIG. 4 illustrates a system 400 that increases the speed of face detection. System 400 includes a data store 410. The data store 410 may store data that identifies the location of a face previously detected by a face detection logic 415. The face detection logic 415 may perform, for example, an ELESSS process to detect faces. System 400 includes logics to control the face detection logic 415 to only selectively perform the ELESSSS process based on whether a region to be tested has already been identified as including a face.

System 400 also includes an overlap logic 420. The overlap logic 420 may determine a patch overlap based, at least in part, on data that identifies the location of a face previously detected by the face detection logic 415. This data may be stored in data store 410. Determining the patch overlap may include computing the number of patch pixels that overlap the locations of faces previously detected by the face detection logic 415. The number of patch pixels that overlap may then be divided by the number of pixels in the patch to determine the patch overlap. One skilled in the art will realize that means other than totaling and dividing may be used to calculate the patch overlap.

System 400 also includes a control logic 430. The control logic 430 may control the face detection logic 415 to search for a face in response to determining that the patch overlap does not exceed an overlap factor. The control logic 430 may base its decision on how to control face detection logic 415 on, for example, the overlap computed by the overlap logic 420.

The control logic 430 may control an every location every scale search sampling logic (ELESSSL) 440. The control logic 430 may control the ELESSSL 440 to step to the next patch without controlling the face detection logic 415 to detect a face on the patch in response to the overlap logic 420 determining that the patch overlap exceeds the overlap factor. However, the control logic 430 may control the face detection logic 415 to detect a face on the patch before the ELESSSL 440 steps to the next patch. This control may occur in response to determining that the patch overlap does not exceed the overlap factor.

The ELESSSL 440 may include a patch incrementor 450 to identify patch locations to be examined. In one example, the patch incrementor may select patches, for example, from left to right and top to bottom. In addition, the ELESSSL 440 may also include a patch scaler 460 to control the re-scaling of the patch dimensions after stepping is complete. This re-scaling may be performed, for example, after the ELESSSL 440 is done with stepping through the patch locations from left to right and top to bottom. Control logic 430 may provide a control signal to control ELESSSL 440, patch incrementor 450, and/or patch scaler 460. This signal may communicate to the ELESSSL 440 whether to increment, whether to rescale, and so on.

Figure 5:
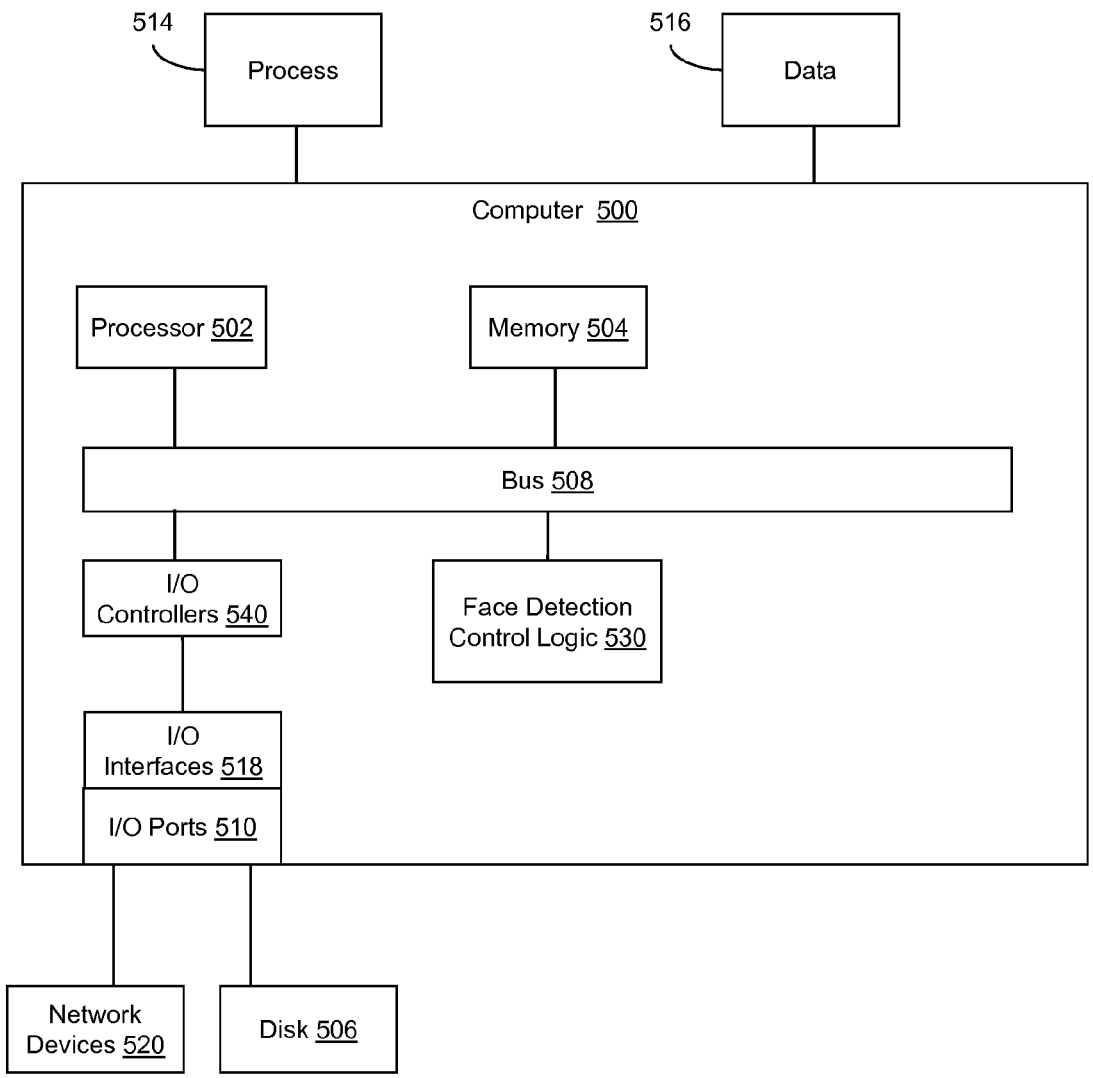
FIG. 5 illustrates an example computing environment in which example systems and methods, and equivalents, may operate to increase the speed of face detection.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a face detection control logic 530 configured to facilitate increasing face detection speed. In different examples, the logic 530 may be implemented in hardware, software, firmware, and/or combinations thereof. While the logic 530 is illustrated as a hardware component attached to the bus 508, it is to be appreciated that in one example, the logic 530 could be implemented in the processor 502.

Thus, logic 530 may provide means (e.g., hardware, software, firmware) for determining a patch overlap for a patch based, at least in part, on the data that identifies the location of a previously detected face. Logic 530 may also provide means (e.g., hardware, software firmware) for determining whether to control a face detection logic to selectively perform a face detection in the patch in a digital image based, at least in part, on the patch overlap. Logic 530 may also provide means (e.g., hardware, software, firmware) for providing a signal to control the FDL to perform the face detection upon determining that the patch overlap does not exceed an overlap factor. The means associated with logic 530 may be implemented, for example, as an ASIC programmed to improve face detection speed. The means may also be implemented as computer executable instructions that are presented to computer 500 as data 516 that are temporarily stored in memory 504 and then executed by processor 502.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM drive, a Blu-Ray drive, an HD-DVD drive, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

Figure 6:
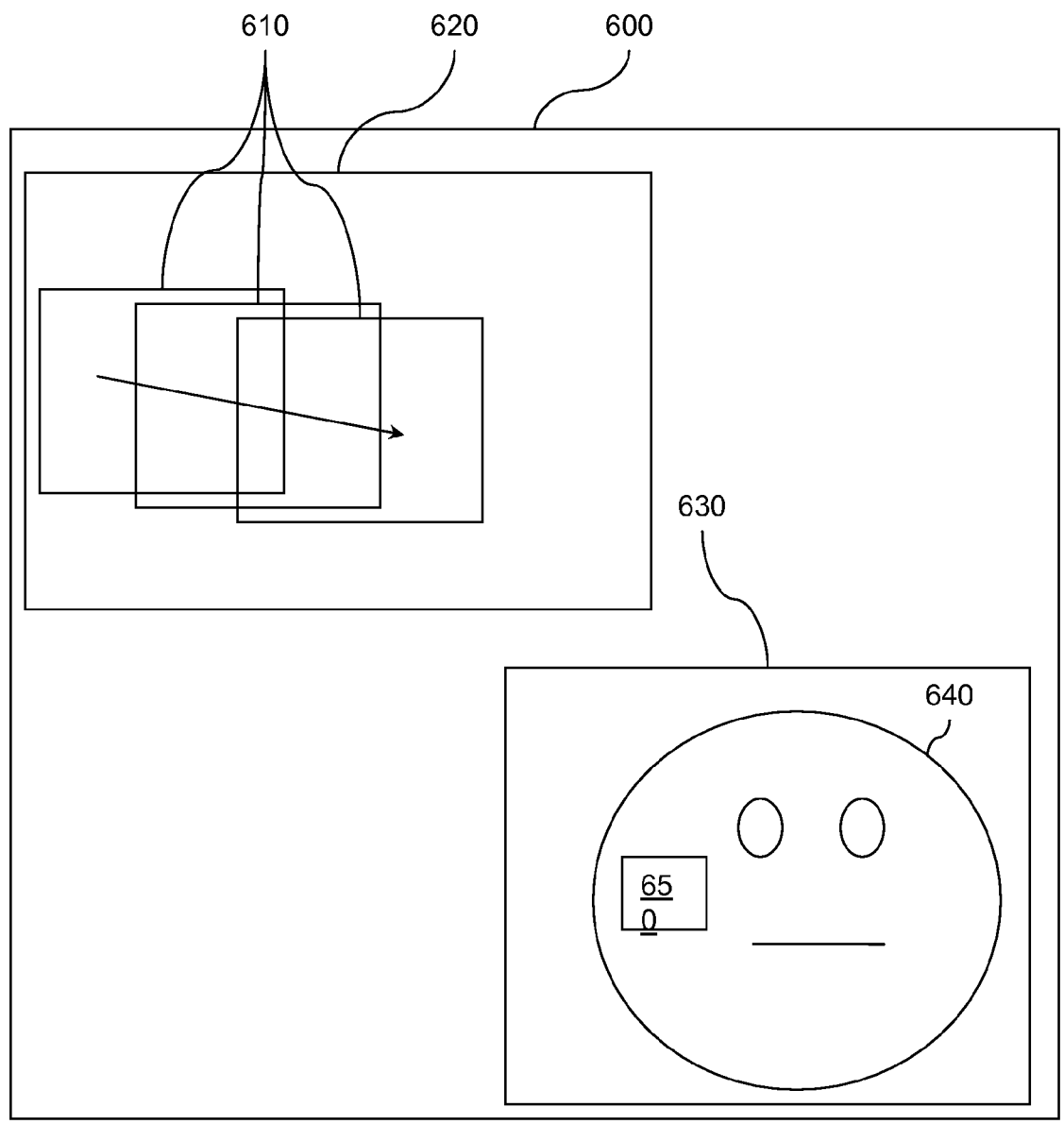
FIG. 6 illustrates an example digital image environment in which the ELESSS operates. The ELESSS may be modified to increase the speed of face detection.

FIG. 6 illustrates an example digital image environment in which an ELESSS may operate. An ELESSS may be controlled by example systems and methods described herein to increase the speed of face detection. A digital image 600 illustrates different examples of patches and images. Digital image 600 includes a set of patches 610. The set of patches 610 are shown as being incremented from left to left and from top to bottom. One skilled in the art will realize that stepping may be performed in a multitude of directions.

Patches 610 represent patches examined at a first scale. Patch 620 illustrates a patch that may be examined at a second scale. Note that patch 620 includes all of patches 610. Thus, if a face had been located in the patches 610, patch 620 may not be examined for a face. Similarly, if a face had been located in patch 620, then patches 610 may not have been examined. Digital image 600 includes a patch 630 that contains a face 640. Image 600 also includes a patch 650 that is illustrated inside patch 630. Example systems and methods facilitate controlling a face detection logic to not search patch 650 since patch 630 already includes face 640.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a computer cause the computer to:
determine whether a particular patch in a digital image overlaps a face previously identified by a face detection process (FDP) by more than an overlap factor;
provide a signal to control the FDP to perform a face detection in the particular patch in response to determining that the overlap does not exceed the overlap factor; and
proceed to a next patch in the digital image without performing the face detection in the particular patch in response to determining that the overlap exceeds the overlap factor, where determining that the overlap does not exceed the overlap factor includes:
computing a number of patch pixels of the particular patch that overlap locations of faces previously detected by the FDP;
dividing the number of patch pixels that overlap by a number of pixels in the particular patch to determine the patch overlap; and
comparing the patch overlap to the overlap factor to determine that the patch overlap does not exceed the overlap factor, where the overlap factor is a pre-determined percentage.

2. The computer-readable medium of claim 1, where the particular patch is a defined area of the digital image and where the overlap factor measures a percentage of pixels in the particular patch that are in locations already identified as including a face.

3. The computer-readable medium of claim 1, including storing, in a data store, data that identifies locations of faces previously detected by the FDP.

4. The computer-readable medium of claim 3, where storing the data that identifies the locations of faces includes storing data that identifies a location of a patch that contains faces.

5. The computer-readable medium of claim 1, wherein the instructions when executed cause the computer to:
store, in a data store, data that identifies a location of a face in response to the FDP determining that the particular patch being searched contains the face.

6. The computer-readable medium of claim 5, where storing the data that identifies the location of the face includes storing location data that identifies the particular patch that contains the face identified by the FDP.

7. A non-transitory computer-readable medium storing computer-executable instructions that when executed by a computer cause the computer to:
determine whether to control a face detection process (FDP) to selectively perform a face detection in a patch in a digital image based, at least in part, on determining whether the patch overlaps a face previously identified by the FDP by more than an overlap factor; and
provide a signal to control the FDP to perform the face detection upon determining that a patch overlap does not exceed the overlap factor,
where the patch is a defined area of the digital image and where the overlap factor measures a percentage of pixels in the patch that are in locations already identified as including a face,
where the FDP is performed to control an every location every scale search sampling (ELESSS) that steps through patch locations in the digital image.

8. The computer-readable medium of claim 7, wherein the ELESSS steps to a next patch location without performing the face detection on the patch upon determining that the patch overlap exceeds the overlap factor.

9. The computer-readable medium of claim 7, wherein the ELESSS incrementally steps through different patch locations in the digital image.

10. The computer-readable medium of claim 9, where patch dimensions of patches at the different patch locations are constant throughout the steps.

11. The computer-readable medium of claim 10, wherein the ELESSS re-scales the patch dimensions after completing a pass through the digital image.

12. The computer-readable medium of claim 7, where the ELESSS includes:
defining dimensions of the patch to search for a face using the FDP;
stepping through the patch locations of the digital image to search patches with the FDP; and
re-scaling the patch dimensions after stepping through the patch locations, where the patch dimensions are re-scaled and the ELESSS steps through the patch locations again using patches with new dimensions.

13. The computer-readable medium of claim 12, where defining the dimensions of the patch includes defining a rectangular window.

14. A system, comprising:
- at least one processor;
- a data store to store data that identifies a location of a face previously detected by a face detection logic;
- an overlap logic to determine a patch overlap that indicates an amount of overlap of a particular patch with a region containing the face, where the determining is based, at least in part, on the data that identifies the location of the face previously detected by the face detection logic; and
- a control logic to:
  - control the face detection logic to search for a face in the particular patch in response to determining that the patch overlap does not exceed an overlap factor; and
- cause the face detection logic to skip searching for a face in the particular patch in response to determining that the patch overlap exceeds the overlap factor, where determining that the patch overlap does not exceed the overlap factor includes:
  - computing a number of patch pixels of the particular patch that overlap locations of faces previously detected by the face detection logic;
  - dividing the number of patch pixels that overlap by a number of pixels in the particular patch to determine the patch overlap; and
  - comparing the patch overlap to the overlap factor to determine that the patch overlap does not exceed the overlap factor, where the overlap factor is a pre-determined percentage.

15. The system of claim 14, where the particular patch is a predefined area of a digital image that is searched for a face, where the particular patch has a location and a scale.

16. The system of claim 14, where the overlap logic is to compute the patch overlap by comparing a location of the particular patch to the stored data.

17. A system, comprising:
- at least one processor;
- a data store to store data that identifies a location of a face previously detected by a face detection logic;
- an overlap logic to determine a patch overlap based, at least in part, on the data that identifies the location of the face previously detected by the face detection module; and
- a control logic to:
  - control an every location every scale search sampling logic (ELESSSL) to step to a next patch without controlling the face detection logic to search for a face in a current patch upon determining that the patch overlap exceeds an overlap factor; and
  - control the face detection logic to search for a face in the current patch before controlling the ELESSSL to step to the next patch upon determining that the patch overlap does not exceed the overlap factor.

* * * * *